INVENTOR
FRANZ J. BENJAMIN

BY Finnegan & Henderson
ATTORNEYS

July 9, 1968  F. J. BENJAMIN  3,391,535
BURNER ASSEMBLIES

Filed Aug. 31, 1966  4 Sheets-Sheet 4

INVENTOR
FRANZ J. BENJAMIN

BY *Finnegan & Henderson*

ATTORNEYS

United States Patent Office 3,391,535
Patented July 9, 1968

3,391,535
BURNER ASSEMBLIES
Franz J. Benjamin, Weatogue, Conn., assignor to United
Aircraft Corporation, East Hartford, Conn., a corporation of Delaware
Filed Aug. 31, 1966, Ser. No. 576,331
6 Claims. (Cl. 60—39.74)

ABSTRACT OF THE DISCLOSURE

A fuel injection system is provided for the burner assembly of gas turbine engines. The burner assembly includes an air entrance duct, a compressor for compressing air admitted through the duct and a combustion chamber into and through which the air flows. The fuel injection system includes a plurality of fuel injection nozzles spaced around the periphery of the wall of the combustion chamber and oriented to spray a cone of fuel in a radially inward and upstream direction against the flow of air entering the combustion chamber.

---

This invention relates to burner assemblies including a combustion chamber and fuel supply means in which a liquid fuel is injected into a moving air mass within the combustion chamber and burned to yield energy, such as in gas turbine engines, turbojet engines, turbo-prop engines, and similar engines relying on combustion of a moving fuel-air mixture to yield propulsive force.

More particularly, this invention relates to burner assemblies comprising a combustion chamber for gas turbines, jet engines, or other purposes in which liquid fuel is injected in the form of a spray directed towards the entrance of the chamber, against the direction of flow of a moving air mass entering the chamber.

In the operation of gas turbines or jet engines, air is introduced into an entrance duct and compressed by a compressor immediately aft of the entrance duct. Fuel is added to the compressed air mass after it leaves the compressor and flows through the engine by injecting it into the moving air mass and burning the resulting mixture. The combustion of the fuel-air mixture then yields energy, all or part of which drives the turbine blades at the rear of the engine. An important object in proper combustion chamber design for such jet engines is to stabilize the flame. When high pressure air comes out of the engine compressor, it is at a high velocity, and it is necessary to reduce this velocity to a magnitude that is less than flame-extinguishing and one which will promote efficient combustion of the fuel-air mixture in the engine combustion chamber.

To achieve this desirable reduction in velocity, the compressed air mass is diffused between the compressor exit and the entrance to the combustion chamber. The diffusion reduces the velocity of the air mass and increases its static pressure. As the diffused air mass enters the combustion chamber, it is important that the fuel be mixed intimately and substantially uniformly with the air to avoid pockets of overrich and overlean fuel-air mixture within the chamber.

In the typical operation of a jet engine, as the fuel-air mixture moves downstream in the combustion chamber or burner portion of the engine, mixing of the fuel and air becomes more intimate and uniform, and the mixture is then ignited to produce burning or combustion.

In the jet engine prior art the usual and almost uniform practice has been to inject fuel in the same direction in which the air mass flows through the combustion chamber. When the fuel is injected downstream in this manner, the space in the front end of the combustion chamber forward of the injection nozzles is, of course, not used for combustion, and also some of the space immediately downstream of the fuel nozzles must be used to atomize the fuel in the air before combustion can begin.

Accordingly, in the past various devices have been suggested for use with jet engine combustion chambers, to inject fuel upstream against the flow of the incoming air mass. All of these prior art devices have, however, contemplated mounting or suspending a fuel nozzle together with its fuel supply conduit in the center of the combustion chamber. Although such an arrangement is workable, and achieves some of the advantages of upstream injection that are achieved by the present invention, such as rapid and thorough fuel-air mixing, it also has an outstanding drawback.

If, in these prior art devices, the fuel nozzle, one of its supporting struts, or the fuel supply means—any or all of which may be inside the burning region—should burn off or break loose during operation of the engine, such parts are of sufficient size, hardness, and weight to severely damage or destroy the turbine blades in passing downstream through the turbine section of the engine. By thus burning or breaking off, these parts can cause engine failure, or even explosion. With upstream injection, the likelihood of various parts of the fuel assembly burning or tearing off is increased, because the combustion process begins at the front end of the combustion chamber and causes the fuel assembly to be subjected to the intense heat and corrosive eroding effects induced by combustion surrounding the assembly. The burning or breaking off of a part is thus more probable with upstream injection than with conventional downstream injection where the fuel nozzle is upstream from the burning region and is not actually located in a hot area.

Accordingly, it is a primary object of this invention to provide a new and improved burner assembly for jet engines or the like in which the desirable characteristics of upstream fuel injection against the incoming air mass are achieved without introduction of any parts into the combustion chamber proper that could break off, or burn off, and damage or destroy the turbine blades. In achieving this object, a plurality of fuel nozzles are spaced at appropriate intervals around the periphery of the combustion chamber and oriented so that, although they spray a cone of fuel in a radially inward and upstream direction, they do not significantly project into the area of the combustion chamber itself.

Another object of this invention is to provide a new and improved means of injecting fuel into a jet engine combustion chamber in which the method of fuel injection itself, the resulting nature of the fuel-air mixture, and the location of the onset of combustion within the chamber combine to provide the characteristics of a flameholder, where a flameholder is defined as a device in the burning region of the engine that holds the flame within a desired area of the combustion chamber by interrupting and changing the flow of hot burning gases and creating local turbulence. It has been found that the upstream, peripheral fuel injection system of this invention creates turbulence so effectively that burning proceeds within the combustion chamber as though a physical flameholder mechanism were actually present. The fuel injection system of this invention thus acts to slow down the velocity of fuel-air mass in the combustion chamber and improves the uniformity of the fuel-air mixture to yield a desirable smooth and even progression of combustion throughout the chamber.

Another object of this invention is to provide a fuel injection system for jet engines in which the fuel is injected from the periphery of the combustion chamber in a radially inward and upstream direction and in which no struts, nozzles, or other mechanical parts obstruct into the interior of the combustion chamber where they could burn or break loose and thus damage the turbine blades in passing downstream through the engine.

A further object of this invention is to provide a novel fuel injection system for jet engines that enables the conventional length combustion chamber to be substantially shortened with savings in space and weight, but without any loss in engine efficiency.

Other objects of this invention are to provide a novel and improved fuel injection system for jet engines that yields an improved turbine temperature profile for the burner portion of the engine, i.e., a temperature profile, measured at the turbine face, which is more uniform than that achieved with conventional burners. Moreover, this improved temperature profile is attained without any increase in the total pressure loss in the engine, where total pressure is defined as the sum of the static pressure and the velocity head of the air mass. With the peripheral fuel injection system of this invention, the turbine temperature profile more closely approaches the ideal profile than is possible with conventional present-day injection systems.

A further object of this invention is to provide a fuel injection system for jet engines that makes it possible to create a higher average turbine inlet temperature and thereby increase the overall efficiency of the engine. The increase in average turbine-inlet temperature is a particularly important beneficial result of this invention. With the upstream, peripheral fuel injection systems of this invention, it is possible to achieve a more uniform temperature distribution than is exhibited with conventional engines.

In the usual engine as the temperature in the combustion chamber rises, undesirable local hot spots become more numerous and intensified preventing safe attainment of a high average turbine inlet temperature, whereas with the fuel injection systems of this invention, as the temperature goes up, the turbine-inlet temperature profile more closely approaches the ideal. In other words, as the average temperature goes up with the fuel injection systems of this invention, the peak, or hot spot, temperature does not go up correspondingly. In prior art injection systems, however, as the average turbine-inlet temperature goes up, the peak temperature also goes up resulting in a sharp limitation on the maximum operating temperature and efficiency obtainable from a given engine design.

A further object of this invention is to provide a fuel injection system for jet engines that makes it possible for the engine to emit almost no smoke, as contrasted with prior art engines using conventional fuel injection systems that leave a detectable smoke trace.

With conventional injection systems, jet engines typically generate a yellow burning flame, but with the fuel injection systems of this invention a light blue flame is obtained. This light blue flame evidences the superior and more complete combustion obtainable with the fuel injection systems of this invention.

In accordance with the invention, the combination of outstanding flameholding characteristics achieved by the increased turbulence of the fuel-air mixture induced by forcing atomized fuel against the flow of the incoming air mass, together with the better temperature profile obtained with peripheral upstream injection, imparts to the fuel injection systems of this invention important beneficial results not attainable with conventional prior art systems.

A further object of this invention is to provide a fuel injection system that will yield more even and uniform fuel distribution than it has been possible to achieve in the past and that is distinctly superior to the fuel distribution feasible with downstream injection.

As a partial summary, this invention, in providing a novel and improved fuel injection system for jet engines, achieves the following advantages and unexpected beneficial results over prior art injection systems:

(1) A better and more uniform turbine temperature profile is obtained and hot spots are reduced, permitting a higher average turbine-inlet temperature with a corresponding increase in engine efficiency;

(2) A shorter length combustion chamber is made possible with concomitant savings in space and weight— with this invention the entire combustion chamber can be used for mixing and combustion;

(3) Faster intermixing of the fuel-air mixture is obtained and more uniform fuel distribution is achieved;

(4) More efficient combustion and cleaner burning are achieved;

(5) No mechanical parts are added to the system that obstruct into the combustion chamber where they could burn or break off and pass downstream into the turbine; and (6) There is no increase in engine total pressure loss over prior art systems.

Additional objects and advantages will be set forth in part in the description that follows and, in part, will be obvious from that description or, may be learned from practice of the invention, the objects and advantages being realized and attained by means of the instrumentalities, mechanisms, and combinations particularly pointed out in the appended claims.

To achieve its objects, and in accordance with its purpose, this invention comprises an improvement for use in a gas turbine engine having an air entrance duct, a compressor, a combustion chamber, a turbine, and an exhaust duct. As embodied and broadly described, the improvement of this invention comprises a plurality of means for supplying fuel to the combustion chamber arranged around the periphery of the wall of the combustion chamber and oriented to direct fuel in the form of a spray in a radially inward and upstream direction against the flow of the incoming air mass through the combustion chamber, whereby fuel atomization, fuel-mixing, and turbulence of the fuel-air mixture are induced beginning at the forward end of the combustion chamber, and balanced fuel distribution, a thorough fuel-air mixing, and substantially uniform combustion throughout the chamber results.

The invention consists in the novel parts, construction, arrangements, combinations, and improvements shown and described.

The accompanying drawings which are incorporated in and constitute a part of this specification illustrate one or more embodiments of the invention and, together with the description, serve to explain the principles of the invention.

Figure 1:
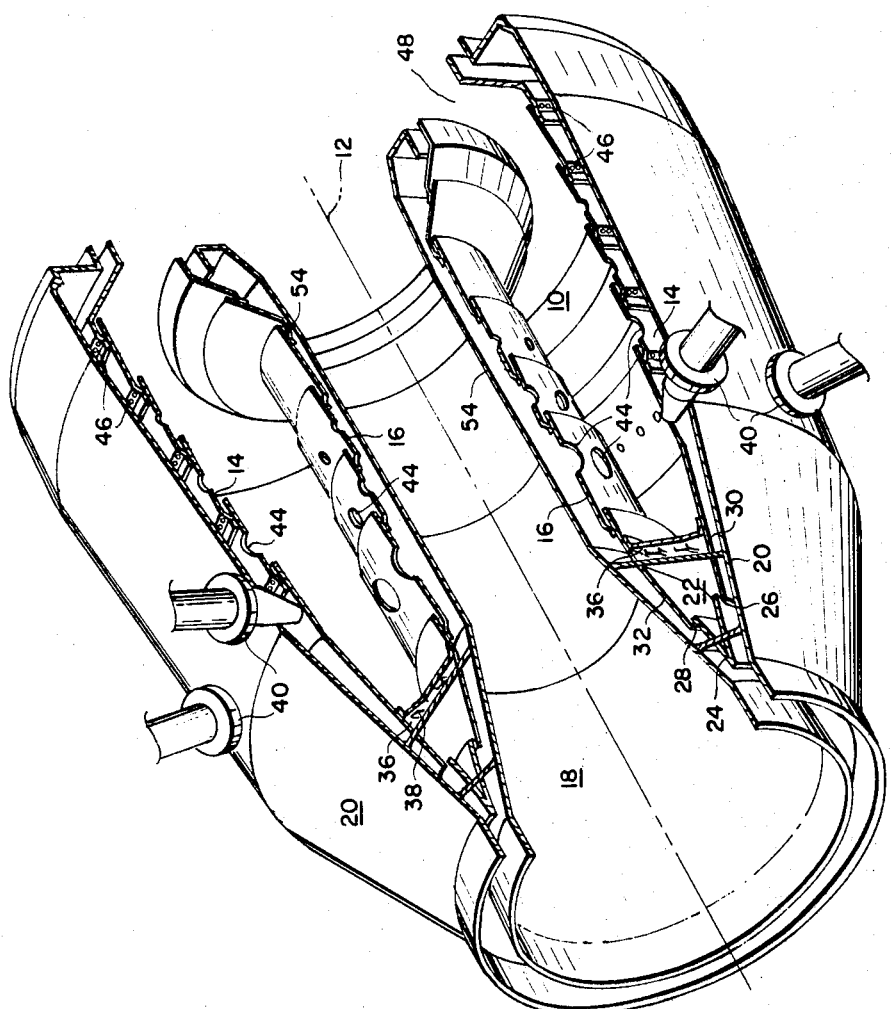
FIG. 1 is a perspective view of an annular or ring type combustion chamber of a jet engine partially broken away and with certain details omitted for clarity.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

As discussed above, this invention relates broadly to engines having combustion chambers in which a liquid fuel is injected into a moving air mass and the resulting fuel-air mixture is burned to produce energy and propulsive force. More particularly, this invention is directed to a new and improved means for injecting and distributing fuel in the combustion chamber of a gas turbine or jet engine. Two possible embodiments of the invention are illustrated in the drawings.

FIG. 1 is a perspective view of the burner or combustion chamber portion of a jet engine. For clarity of description parts not necessary to an understanding of the invention have not been illustrated. Accordingly, the air entrance duct, the compressor, the turbine, and the exhaust duct of the jet engine are all omitted from the portion of the engine depicted in FIG. 1.

Figure 2:
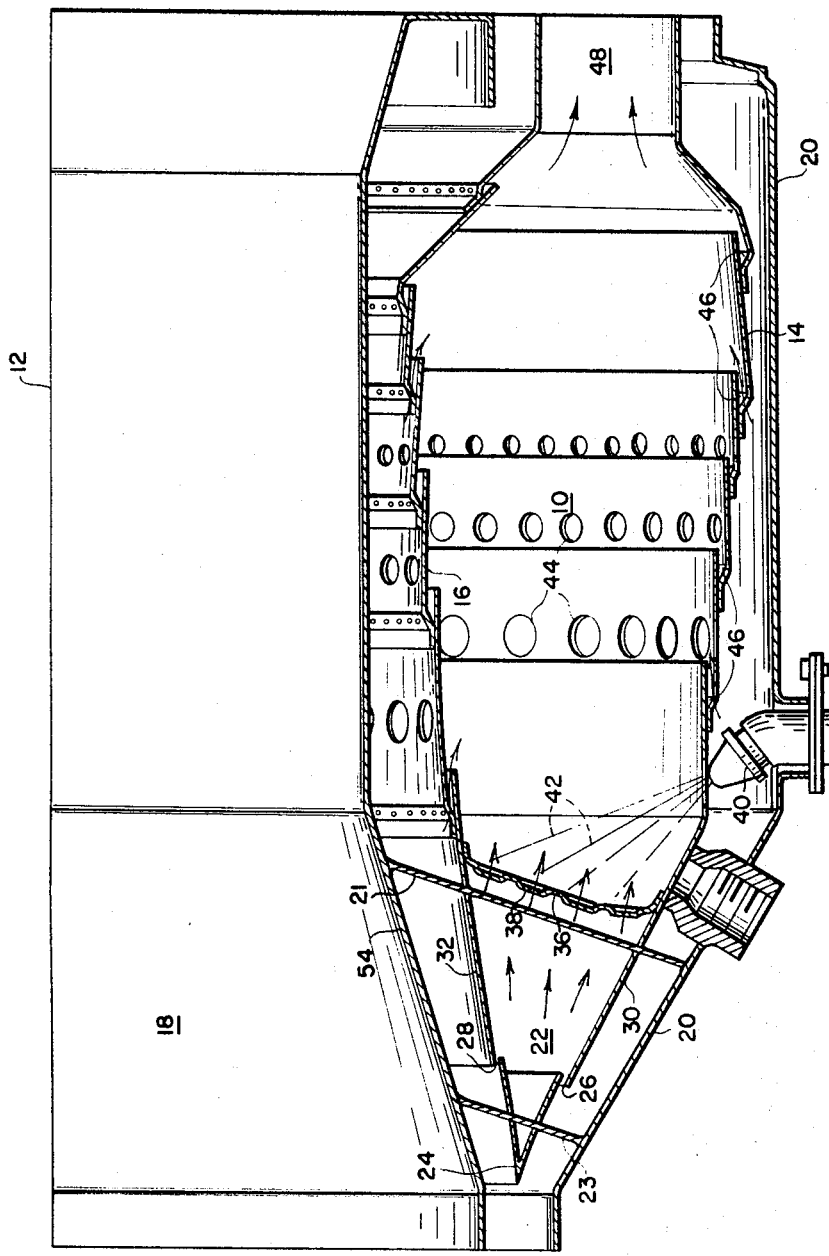
FIG. 2 is a partial central vertical section of FIG. 1 illustrating the burner section.

As shown in FIG. 1 and FIG. 2, which is a partial sectional view of the bottom half of the burner of FIG. 1, the air entrance duct and the compressor would be to the left of the portion of the engine illustrated, and the turbine and exhaust duct would be to the right of the portion illustrated.

Within the burner assembly section of the engine illustrated in FIG. 1, an annular or ring-type combustion chamber is provided, as shown generally at 10, about a central axis 12 of the engine. The outer wall of the combustion chamber is shown generally at 14 and the inner wall is shown generally at 16.

As shown in FIGS. 1 and 2, the main shaft of the engine not shown, would be journaled centrally of the combustion chamber within the space 18, with internal structural supports 21 and 23 being provided between the internal structural wall 54 and the outer wall 20 of the engine running through the diffuser 22, which is located at the front end of the combustion chamber 10 and just aft of the compressor section (not shown).

Figure 3:
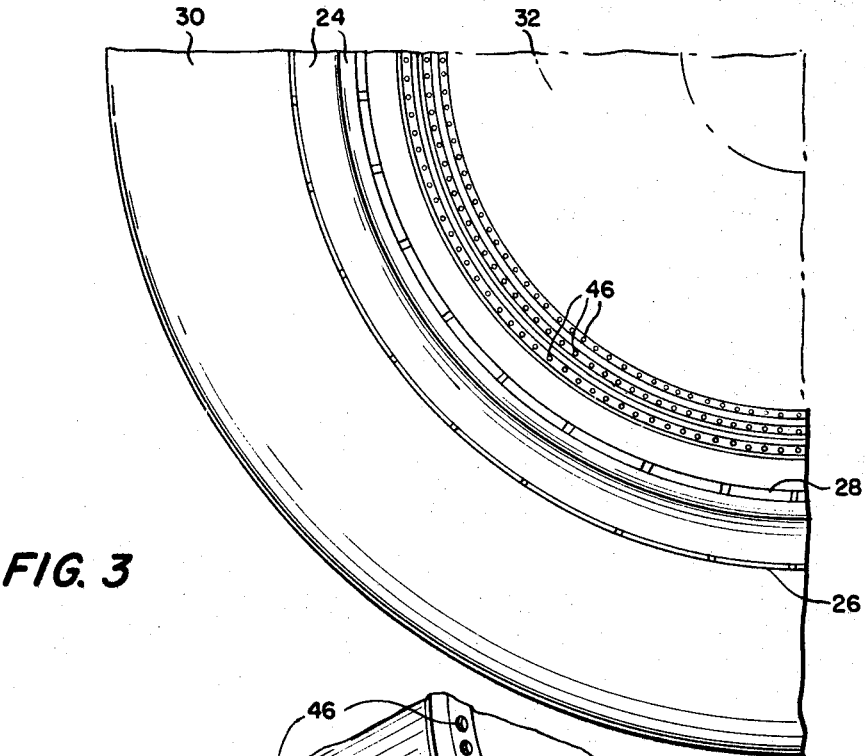
FIG. 3 is a partial front elevation view of the burner section of FIG. 2 with portions omitted for clarity.

Air immediately upon leaving the compressor strikes the diffuser 22 at its front nose section 24, and from there a portion of the air mass from the compressor enters the diffusion section of the burner assembly through diffuser ports 26 and 28 (FIGS. 1, 2, and 3). This portion of the air is known as "primary air" and is the air that, together with injected fuel, forms the initial fuel-air mixture used to begin combustion within the combustion chamber.

The remainder of the air mass from the compressor, moving at a high velocity, divides. One portion passes between the outer wall 20 of the engine and the outer wall 30 of the diffuser 22. The second portion of this air mass passes between the internal structural wall 54 of the engine and the inner wall 32 of the diffuser 22. The further paths of these two air masses will be described later.

In accordance with the invention, means are provided at the front of the combustion chamber to aid in creating dispersion of fuel within the primary air mass and turbulence in the fuel-air mixture. This means also serves to slow the speed of the primary air mass entering the front or diffuser section of the burner assembly. If the primary air entering the combustion chamber section of the burner assembly is not slowed, proper combustion of the fuel-air mixture cannot be achieved, because the velocity of the fuel or fuel-air mixture in the chamber would be too much greater than the velocity of combustion, or flame propagation, to permit a substantially complete and efficient combustion reaction to take place.

Figure 4:
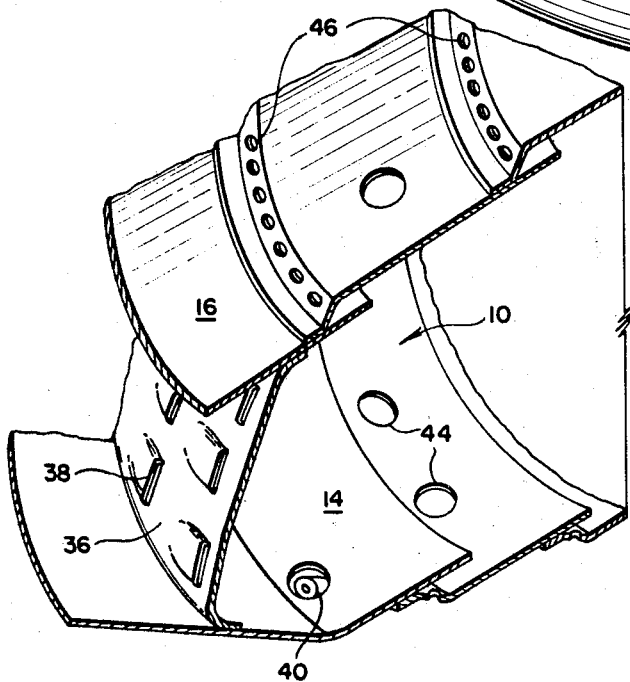
FIG. 4 is a partial perspective view of the front portion of the burner of FIG. 2 shown partially in section and with portions cut away for clarity.

As embodied, this means comprises a primary air entry plate having specially configured perforations for directing the flow of the primary air mass entering the combustion chamber portion of the burner. In a preferred form of the invention, and as embodied and shown in FIGS. 1 and 2 the primary air entry plate 36 is provided with perforations or apertures arranged and configured to create circumferential scooping (see FIG. 4). Circumferential scooping is preferred over either a radially inward or a radially outward configuration for the scooping, because circumferential scooping has been found to create the desired amount and quality of turbulence in the primary air mass entering the chamber.

"Contrascooping" has also been used successfully. In contrascooping, a clockwise direction of thrust is imparted to the air flow by one ring of scoops while an adjacent ring of scoops imparts a counterclockwise direction to the air flow and so on, with the circumferential flow direction imparted by each adjacent ring of scoops being opposite. Thus, if one ring imparts a counterclockwise flow, the rings on each side of it impart a clockwise flow. It has been found that although contrascooping produces better results than radial scooping, uniform clockwise or uniform counterclockwise circumferential scooping produces best results. The swirling of the air created by the primary air entry plate configuration, when circumferential scooping is used, promotes early and desirable mixing of fuel and air within the front end of the combustion chamber.

In accordance with the invention, means are provided for supplying fuel to the combustion chamber in a manner to direct the fuel in the form of a spray in a radially inward and upstream direction against the incoming air flow through the combustion chamber to promote fuel atomization, fuel-air mixing, turbulence of the fuel-air mixture, front-end mixing, and a smooth, even, and efficient combustion within the chamber resulting in a high efficiency of engine operation. As embodied, this means comprises a plurality of fuel supply nozzles arranged around the periphery of the outer wall of the annular combustion chamber depicted in FIG. 1. A representative nozzle 40, as illustrated in FIG. 2, is located in the outer wall 14 of the combustion chamber 10 and oriented so that it directs a cone or spray of fuel 42 in a substantially radially inward and upstream direction against the incoming mass of air which is traveling at a reasonably high velocity. Also, as shown in FIG. 2, the cone or spray of fuel is preferably adjusted to spray or distribute fuel throughout the entire region immediately aft of the primary air entry plate 36.

In accordance with usual jet engine practice, both the outer wall 14 and the inner wall 16 of the combustion chamber are provided with a series of radially-aligned holes 44. These are "secondary air" holes, and in this embodiment are of diminishing area moving aft. "Secondary air" may be defined as mixing air that enters the combustion chamber after combustion has begun and that performs the function of cooling and diluting the hot combustion gases.

Secondary air thus prevents the combustion gases from becoming too hot for the chamber 10 and turbine blades to withstand. It is admitted to the combustion chamber through the secondary air holes 44 in combustion chamber walls 14 and 16. In the present embodiment, these secondary air holes begin slightly aft of where combustion starts.

Another series of holes or apertures 46 is also provided in the walls of the combustion chamber 10. These holes 46 are similarly included in accordance with usual jet engine practice and are used to admit "cooling air" along the walls 14 and 16 of the combustion chamber. Among those skilled in the art, these holes 46 are generally termed "directional film cooling louvers." Cooling air, as distinct from secondary air, is admitted along the side walls of the burner through the directional film cooling louvers 46. The primary function of the cooling air is to cool the walls of the burner, as opposed to secondary air which mixes with and dilutes the fuel-air combustion mixture and more directly participates in the combustion reaction.

The hot expanding combustion gases leave the combustion chamber 10 at exit 48 and are then directed by turbine vanes (not shown) to impinge on the turbine blades (not shown) and drive the turbine which, in turn, drives the compressor stages (not shown) by transmission of power through a central shaft in space 18.

Figure 5:
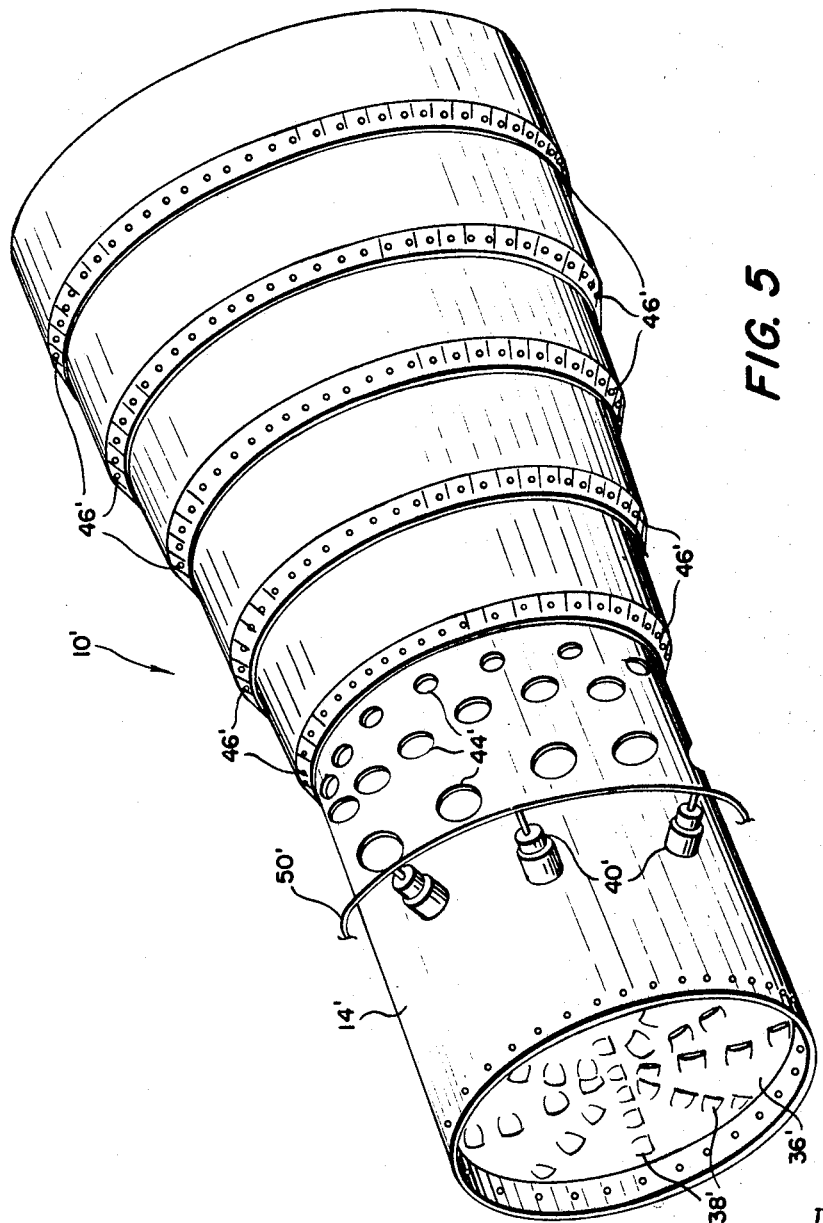
FIG. 5 is a perspective view of a combustion chamber illustrating an alternative embodiment of the invention.

Although the invention has been described to this point with reference primarily to an annular type burner, as illustrated in FIGS. 1–4, the fuel injection system of this invention, as mentioned earlier, is not limited to annular or ring-type burners. It may also be effectively used with individual or "can" type burners. An alternative embodiment of the invention showing its use with a can-type combustion chamber is illustrated in FIG. 5. In actual practice, a series of these can-type burners would be placed in a radial configuration around the circumference of the engine, as is usual in the art.

For clarity of description, the parts of the alternative embodiment illustrated in FIG. 5 that correspond directly with similar parts described in the primary embodiment of FIGS. 1–4 are designated with the same reference numerals but with the numerals primed. For example, the fuel nozzle in the primary embodiment is designated 40 and in the alternative embodiment of FIG. 5 it is designated 40'.

With reference to FIG. 5, an individual primary air entry plate 36' is provided immediately aft of the diffuser (not shown). This primary air entry plate 36' is provided with circumferential louvers 38', similar to those in the primary embodiment. As in the primary embodiment, these circumferential louvers 38' are designed to impart a clockwise, swirling motion to the primary air entering the front of the combustion chamber 10'.

A series of circumferentially arranged fuel nozzles 40' are set in the wall 14' of the combustion chamber immediately aft of the primary entry plate 36'. As in the primary embodiment, each of these fuel nozzles 40' is oriented to deliver a cone-shaped spray of atomized fuel both radially inward and forward, or upstream, into the flow of incoming air. The incoming air mass enters the combustion chamber from the primary air entry plate 36' through the circumferential scooping louvers 38' with a swirling or turbulent motion already imparted to it. The fuel nozzles 40' are oriented so that the fuel sprays cover the area of the primary air entry plate 36' with a substantially uniform distribution of atomized fuel.

As in the primary embodiment and in accordance with the invention, fuel nozzles 40' of this alternative embodiment (FIG. 5) are set in the walls 14' of the combustion chamber so that there are no portions of the nozzles or fuel supply structure that protrude into the combustion chamber itself, where such parts might be subjected to the risk of burning or breaking off and causing turbine failure.

Also, as in the primary embodiment, secondary air holes 44' are provided immediately aft of the fuel injection nozzles 40'. Immediately downstream from the secondary air holes 44' there is a series of circumferential film cooling louvers 46' arranged in each of the aft sections of the combustion chamber. In the present embodiment, as shown in FIG. 5, each section—moving downstream—has a larger diameter than its adjacent upstream section, although such progressively increasing diameter sections are not necessarily required or desirable. The secondary air holes 44' and circumferential film cooling louvers 46' serve essentially the same functions in this alternative embodiment of the invention as are served by the secondary air holes 44 and film cooling louvers 46 of the primary embodiment.

Provision is also included in the alternative embodiment of FIG. 5 for a fuel manifold 50' which encircles the burner can and connects the individual fuel nozzles 40' to the main fuel supply (not shown). The fuel manifold 50' delivers fuel under pressure to the fuel nozzles 40' and insures that each nozzle receives an adequate supply of fuel.

As in the primary embodiment, the fuel nozzles 40' of the alternative embodiment are located near the front end of the burner can or combustion chamber 10' and oriented so that atomized fuel is sprayed directly toward the inner face of the primary air entry plate 36' by the nozzles 40'. By directing the atomized sprays of fuel toward and against the inner surface of the primary air entry plate 36' of the burner can, the fuel injection system of this invention ensures that the front-end space of the burner can or combustion chamber 10' is used for both mixing and combustion of the fuel.

In accordance with the invention, the primary air entering through the circumferential louvers 38' is swirled and made turbulent by the configuration of the louvers 38'. The turbulence of the flowing air mass promotes thorough and even mixing of the fuel-air combination and enhances uniform combustion.

In the alternative embodiment of FIG. 5, it has been found that the combustion chamber works well when about thirteen (13) nozzles per burner can are used. Similarly, in the primary embodiment, which uses an annular combustion chamber, it has been found that twenty-four (24) nozzles substantially equally spaced around the circumference of the annular combustion chamber yield a uniform fuel distribution resulting in superior combustion characteristics. The number of nozzles used per combustion chamber is, however, within the skill of the art and will vary according to the size of the individual combustion chambers and may be tailored to fit the conditions encountered and results sought.

In accordance with the invention, the annular or ring-type combustion chamber requires fewer fuel nozzles per engine which is an advantage over the individual burner can alternative embodiment illustrated in FIG. 5. The individual burner can type of combustion chamber is, however, more easily replaceable than the annular type illustrated in FIGS. 1–4.

As shown in FIG. 2, an ignition means, such as an igniter, is provided within receptacle 52 to ignite the fuel-air mixture and initiate combustion in the engine. Once combustion has been initiated by the igniter, however, it becomes self-supporting and will maintain itself through the continuous feeding of additional fuel into the combustion chamber. The igniter is thus needed only to initiate the combustion reaction.

As a feature of the particular embodiment shown, the outer wall 20 guides and smooths the air flow passing along the exterior of the outer wall 14 of the combustion chamber until it enters the last (aftmost) row of circumferential film cooling louvers 46.

A second inner wall 54 is also provided radially inward from the annular combustion chamber 10. Its function is similar to the function of the outer wall 20 in that it, too, serves to guide and smooth the air flow. This inner wall 54 also serves as part of the structural support for the main shaft of the engine.

In operation, as illustrated by the primary embodiment of FIGS. 1–4, a mass of air under high velocity is discharged from the last stage of the compressor and is fed directly to the nose 24 of the diffuser 22 of the burner assembly. The air stream is, in essence, split by the nose 24 into two substantially equal portions.

Part of the lower portion enters into the diffuser 22 of the burner assembly through lower diffuser ports 26, and part of the upper portion enters into the diffuser assembly through upper diffuser ports 28. The remainder of the lower portion of the air mass flows toward the rear of the engine through and diffuses in the space between the outer wall 14 of the burner assembly and the outer wall 20 of the engine. The remainder of the upper portion of the air mass flows through and diffuses in the space between the inner wall 16 of the burner assembly and the wall 54.

The air entering the diffuser 22 flows back until it strikes the primary air entry plate 36. The circumferential louvers 38 (FIG. 4) in the primary air entry plate then admit the air into the front end of combustion chamber 10. The primary air entry plate 36 and its circumferential louvers 38 (FIG. 4) serve to swirl the mass of air entering the combustion chamber. When the air mass flows into the front of combustion chamber 10, it is immediately impacted against the spray of atomized fuel being injected by fuel nozzle 40.

As in the alternative embodiment of FIG. 5, so also in this primary embodiment, the fuel for the fuel nozzle 40' is supplied by a fuel manifold under pressure to insure an even supply of fuel to each of the plurality of nozzles 40' around the circumference of the burner assembly.

The swirling turbulence of the incoming air mass intimately mixes the atomized fuel from the fuel nozzle 40 with the air mass and provides a fuel-air mixture in which the fuel is substantially uniformly distributed in atomized form throughout the air. To initiate combustion, the igniter in receptacle 52 injects a spark into the front end of the burner causing the combustion reaction to begin. As the fuel-air mixture flows rapidly downstream through combustion chamber 10 it continues to burn and to add energy to the moving gases through the combustion reaction.

A portion of the air mass flowing and diffusing between wall 30–14 and wall 20 and a portion of the air mass flowing and diffusing between wall 32–16 and wall 54, after flowing back just aft of fuel nozzles 40, flows and diffuses into combustion chamber 10 through secondary air holes 44. This secondary air cools and dilutes the hot combustion gases, thereby reducing their overall temperature to a magnitude that the turbine can withstand.

Similarly, another portion of each of these air masses flows and diffuses further downstream and enters combustion chamber 10 through the series of circumferential film cooling louvers 46 that surround chamber 10, as shown in FIGS. 1–4. This cooling air admitted through circumferential film cooling louvers 46 cools the walls of chamber 10 and prevents them from becoming too hot. Cooling air is thus distinct from secondary air in that secondary air is used primarily for combustion—but with a diluting and cooling effect on the combustion section—while cooling air is used primarily for cooling.

Upon reaching exit nozzle 48 of combustion chamber 10 the hot, expanding gases are moving at a high velocity. These hot combustion gases are then guided by stationary turbine vanes (not shown) into the front end of the turbine where they impinge on turbine blades and provide the energy to drive the turbine, which in turn drives the compressor and engine accessories.

In operation, the alternative embodiment of FIG. 5 is substantially identical to the primary embodiment of FIGS. 1–4, which has just been described.

In summary, the present invention includes within its attributes the following beneficial results and advantages:

(1) A better turbine temperature profile is obtained and a higher average turbine-inlet temperature is achieved with concomitant advantages in markedly improved engine efficiency.

(2) A shorter length combustion chamber can be used, resulting in savings of space and weight. With front-end upstream injection of fuel, as taught by this invention, the space in the front end of the combustion chamber can be efficiently used for combustion and not just for commencing fuel-air mixing as in conventional engines.

(3) Fuel-air intermixing is faster and more efficient than in conventional engines and results in better combustion and cleaner burning.

(4) Fuel distribution in the combustion chamber is more uniform than with conventional engines.

(5) Upstream injection is achieved without the introduction of any protruding parts to burn or break off and pass downstream with resulting turbine failure.

(6) Desirable flameholding characteristics are created in the combustion chamber by the excellent turbulence pattern created with peripheral upstream injection directly into the air mass flowing through the primary air entry plate and the impact of the atomized fuel on the incoming air mass.

(7) There is no increase in total pressure loss over that of conventional engines.

This invention, in its broader aspects, is not limited to the specific mechanisms shown and described, but also includes within the scope of the accompanying claims any departures made from such mechanisms that do not depart from the principles of the invention and do not sacrifice its chief advantages.

What is claimed is:

1. In a gas turbine engine having an air entrance duct and a compressor for compressing air admitted through the entrance duct into a compressed and flowing air mass, a combustion chamber, a perforated primary air entry plate located at the entrance to the combustion chamber through which a portion of the compressed air mass flows as primary air, the primary air entry plate admitting the primary air into the combustion chamber and creating turbulence in the air as it passes through the plate, a plurality of fuel injection nozzles spaced around the periphery of the wall of the combustion chamber, each nozzle being oriented to spray a cone of fuel in a radially inward and upstream direction onto the primary air entry plate and into the turbulent flow of primary air as it is admitted into the combustion chamber, whereby fuel atomization, fuel-air mixing, and turbulence of the fuel-air mixture are induced, beginning at the forwardmost end of the combustion chamber, and a balanced fuel distribution, thorough fuel-air mixing, and substantially uniform combustion throughout the chamber are achieved.

2. The invention as defined in claim 1, which also includes a diffuser having a diffusion chamber, the diffuser admitting primary air from the compressor into the diffusion chamber, the primary air entry plate being located between the diffusion chamber and the combustion chamber, the diffuser and diffusion chamber acting to reduce the velocity and to increase the static pressure of the air emitted from the last stage of the compressor.

3. The invention as defined in claim 2, in which the primary entry plate has a scoop partially surrounding each perforation, the scoops and perforations being aligned and configured to impart a swirling circumferential motion to the primary air passing through the perforations from the diffusion chamber into the combustion chamber, thereby creating turbulence in the primary air.

4. The invention as defined in claim 1, in which the combustion chamber is annular and has inner and outer walls, and in which the combustion chamber is surrounded by and spaced from an outer engine wall.

5. The invention as defined in claim 4, in which the fuel injection nozzles are disposed around the periphery of the outer wall of the combustion chamber, the nozzles being mounted so that they are substantially flush with the inner surface of the outer wall of the chamber and do not protrude substantially into the chamber.

6. The invention as defined in claim 1, in which the combustion chamber comprises a plurality of individual burner cans and in which the fuel injection nozzles are disposed around the periphery of each individual burner can.

References Cited
UNITED STATES PATENTS

| | | | |
|---|---|---|---|
| 2,720,753 | 10/1955 | Sharpe | 60—39.71 |
| 2,840,989 | 7/1958 | Macaulay | 60—39.65 |
| 2,926,495 | 3/1960 | Benson et al. | 60—39.74 |
| 3,184,918 | 5/1965 | Mulcahey | 60—39.66 |
| 3,283,502 | 11/1966 | Lefebvre | 60—39.74 |
| 2,979,899 | 4/1961 | Salmon et al. | 60—39.74 XR |
| 3,074,668 | 1/1963 | Frenzl | 60—39.74 XR |

JULIUS E. WEST, *Primary Examiner.*